United States Patent [19]

Weissenfels et al.

[11] 4,166,162

[45] Aug. 28, 1979

[54] PHENOLIC RESIN FOAM HAVING REDUCED TENDENCY TO SHRINK

[75] Inventors: Franz Weissenfels, Siegburg; Hans Jünger, Troisdorf, both of Fed. Rep. of Germany

[73] Assignee: Dynamit Nobel Aktiengesellschaft, Troisdorf, Fed. Rep. of Germany

[21] Appl. No.: 858,043

[22] Filed: Dec. 6, 1977

Related U.S. Application Data

[63] Continuation of Ser. No. 636,279, Nov. 28, 1975, abandoned, which is a continuation of Ser. No. 407,689, Oct. 18, 1973, abandoned, which is a continuation of Ser. No. 23,518, Mar. 27, 1970, abandoned.

[30] Foreign Application Priority Data

Apr. 2, 1969 [DE] Fed. Rep. of Germany ....... 1917012

[51] Int. Cl.² .............................................. C08J 9/14

[52] U.S. Cl. ........................................ 521/100; 260/38; 260/32.8 R; 521/181

[58] Field of Search ...................... 260/2.5 F; 521/100, 521/181

[56] References Cited

U.S. PATENT DOCUMENTS

| | | | |
|---|---|---|---|
| 3,298,973 | 1/1967 | Quarles et al. | 260/2.5 F |
| 3,300,422 | 1/1967 | Bayerlein et al. | 260/2.5 F |
| 3,389,094 | 6/1968 | D'Alesandro | 260/2.5 F |
| 3,748,290 | 7/1973 | Reingen | 260/2.5 F |

*Primary Examiner*—Morton Foelak
*Attorney, Agent, or Firm*—Sprung, Felfe, Horn, Lynch & Kramer

[57] ABSTRACT

Foamed phenolic resins containing $CaSO_4 \cdot nH_2O$, where n is 0–2, having reduced tendency to shrink and reduced weight loss on aging.

20 Claims, No Drawings

PHENOLIC RESIN FOAM HAVING REDUCED TENDENCY TO SHRINK

This is a continuation of application Ser. No. 636,279, filed Nov. 28, 1975, now abandoned, which in turn is a continuation of application Ser. No. 407,689, filed Oct. 18, 1973, now abandoned, which in turn is a continuation of application Ser. No. 23,518, filed Mar. 27, 1970, now abandoned.

The present invention relates to phenolic resin foams which, when subjected for long periods to temperatures between 30° and 80° C., undergo little or no shrinkage, and which under normal climatic conditions lose less weight than phenolic resin foams of the prior art.

Phenolic resin foams, which are prepared by the foaming of liquid phenolic resol resins containing hardeners and surface-active agents in open or closed vessels, in the presence of a liquid or solid blowing agent, have the disadvantage that they are subject to a shrinkage which increases as the temperature increases. The result of this shrinkage is that, when phenolic resin foam boards are used for the insulation of large surfaces, roofs, for example, gaps develop between the boards, resulting in heat losses through these gaps.

Additionally, the phenolic resin foams produced by the known methods have the disadvantage that the volatile substances contained in them—mostly water and blowing agent residues—evaporate to some extent when exposed for a long time to room temperature or elevated temperatures. Consequently, when phenolic resin foams are laminated to substantially moisture-proof, stretchable materials, there is a tendency for water vapor bubbles to form under the coating material, resulting frequently in delamination and blistering.

Phenolic resin foams have now been found, which are made by foaming intimate mixtures consisting of liquid phenolic resins, solid or liquid blowing agents, liquid or solid hardeners, and small quantities of surface-active substances in closed vessels or vessels that are open on one side, these foams being characterized by the fact that, prior to the foaming, $CaSO_4 \cdot nH_2O$ is added in powder form in a quantity of from 5 to 50%, and preferably 10 to 30% of the weight of the solid resin content of the phenolic resol resin, n being less than two and preferably between zero and one-half. "Solid resin content" is defined infra.

The addition, according to the invention, of calcium sulfate clearly reduces the shrinkage of freshly made phenolic resin foams during long-term exposure to elevated temperature. Also, there is a reduction of the weight loss that occurs in the case of long-term exposure to normal conditions (23° C. and 50% relative humidity). At the same time it has surprisingly been found that, even when 30 wt-% of $CaSO_4 \cdot \frac{1}{2}H_2O$ is the additive, the fluidity of the mixture prior to foaming is still so good that it has been made into phenolic resin foam boards in double band presses. If the same quantity of the finely powdered fillers of the prior art is added to the starting materials of the phenolic resin foams, this ease of manufacture does not exist.

Another advantage of the new foam is that laminates as described above have a reduced tendency to become blistered.

Surprisingly, too, the addition of $CaSO_4 \cdot \frac{1}{2}H_2O$ did not interfere with the formation of the foam product or result in a deficient structure in same, as might have been expected from the use of such large quantities of a finely powdered filler of great specific weight, for this had been found to be the case with the addition of the same amount of finely powdered $Na_2SO_4$, $ZnCl_2$, kaolin or mica.

If the phenolic resin foams manufactured according to the invention are prepared with the use of solid hardener acids in powder form, the compressive strength is also greater for an equal foam density.

The calcium sulfate used can best contain between 0 and $\frac{1}{2}$ mole of water of crystallization. The crystallization water content of the individual calcium sulfate crystals need not be uniform, so that a mixture of different calcium sulfate crystals can be used whose crystallization water content is within the stated limits. When a mixture of calcium sulfate particles having different crystallization water contents is used, it is also possible for a part of the mixture, though preferably not more than 50%, to have a crystallization water content greater than $\frac{1}{2}$ mole $H_2O$, but less than 2 moles $H_2O$.

The calcium sulfate used can contain up to 5% of other calcium salts, or sulfates of alkali and alkaline earth metals, as well as zinc and aluminum sulfate. The addition of alkali carbonates, bicarbonates and chlorides in quantities of the same order is possible without impairing the quality of the phenolic resin foams manufactured according to the invention.

The size of the calcium sulfate particles can vary widely. Calcium sulfate grains of a diameter of as much as 5 mm can be used. However, a grain size of less than 1 mm, and preferably of less than 0.001 mm, is advisable.

The foams are generally produced by intimately mixing a phenolic resol resin with liquid or solid hardeners, surface-active substances, a blowing agent and the calcium sulfate additive according to the invention, and foaming and setting them in open or closed vessels.

Phenolic resol resins suitable for the preparation of the phenolic resin foams, according to the invention are obtained, for example, by the condensation of one mole of a phenol with 1 to 3 moles of aldehydes in an alkaline medium, then removing the water by vacuum distillation, and, in some cases, adjusting the pH to values greater than 4. Both phenols and their homologs, such as the cresols, and resorcinol, xylenols or mixtures of these compounds, can be used as phenols, according to the invention. The aldehydes reacting with the phenols include formaldehyde, compounds that decompose to formaldehyde such as paraformaldehyde or trioxane, acetaldehyde, furfurol and hexamethylene-tetramine, etc., and mixtures of these compounds.

The condensation is performed in an aqueous alkaline medium.

The compounds used as blowing agents include both solid compounds from which inert gases, preferably carbon dioxide, are liberated by heat, and low-boiling organic solvents. The solid blowing agents are to yield the gases with as little residue as possible, examples being ammonium carbonate or ammonium bicarbonate, or are to leave a residue that is odorless and does not attack the foam, examples being the alkali carbonates and bicarbonates. Furthermore, both inorganic and organic peroxides can be used, such as some of the azo compounds like $\alpha,\alpha$-azodiisobutyric acid nitrile.

Liquid blowing agents include low-boiling organic solvents such as chloroform, carbon tetrachloride, chlorofluoromethane, n-pentane, n-butyl ether, petroleum ether, and ethylene dichloride.

The solid blowing agents are used in quantities of 0.3 to 10% of the weight of the phenolic resol resin. The liquid blowing agents are added in quantities of between 1.0 and 20.0% of the weight of the phenolic resol resin.

The hardeners can be acids in either liquid or powder form. The required amount depends to some extent on the blowing agent that is used; if the blowing agent consists of a solid salt that develops gases, a portion of the acid is used to liberate the gases. When low-boiling solvents are used as the blowing agents the hardener content is correspondingly lower. Suitable water-soluble acids are not only mineral acids (HCl, $H_2SO_4$) but also sulfonic acids which have an especially good solubility in water and in which the sulfonic acid group is linked directly with an aromatic ring, which can be substituted if desired. Examples are benzenesulfonic acid, p-toluenesulfonic acid, chlorobenzene-3,5-disulfonic acid, bromobenzene-4-sulfonic acids, the o-, m- and p-cresolsulfonic acids, or aniline-2,5-disolfonic acid. The sulfonic acid group can also be linked with a polynuclear aromatic radical, as in the case, for example, of the naphthalenesulfonic acid or the naphthylaminesulfonic acids. Aliphatic sulfonic acids, however, can also be used as hardeners, examples being butylsulfonic acids, propylsulfonic acid or hexylsulfonic acid.

The aqueous solution of these acids usually contains 30 to 50% of the acid by weight. Some of the acids, such as p-toluenesulfonic acid, for example, can also be used in powdered form as the hardener. In either case, the amount of 100% acid hardener is between 1.0 and 15.0% of the weight of the phenolic resol resin.

The surface-active agents are used in quantities of 0.4 to 10%, and preferably 1 to 5%, of the weight of the phenolic resol resin. Suitable surface-active agents are, for example: polyethylene ethers of a long-chained monofatty acid ester of sorbitol, such as the polyethylene ether of monolauric-sorbitol ester and the polyethylene ether of monooleic-sorbitol ester, and water-soluble ethoxylated castor oil.

The foaming of the phenolic resin takes place after the individual components have been mixed together, whereupon the blowing agent passes into the gaseous state. Depending on the composition of the mixture that is to be foamed, the foaming process takes place at temperatures between 0° and 100° C., preferably at 15° to 60° C.; the resin can be made to foam either in open or in closed molds to produce molded foam products in the shape of the molds selected.

It is also possible to perform the foaming process continuously, as is known for production of plastic foam products, in a double-band press. In this case the components are proportioned and mixed by means of conventional automatic proportioning and mixing apparatus, and the mixture is continuously fed to the bands of a double-band press by means of a charging apparatus moving back and forth athwart the direction of movement of the bands. Then the mixture is passed through a gap of adjustable width between a roll and a support which may also be in the form of a roll. The roll can be preheated if desired. In this process boards of any desired thickness are obtained.

The hardening is generally controlled in such a manner that, as soon as the desired foam volume is reached, the foam structure has solidified to such an extent that no collapse occurs.

Conventional fillers and/or pigments can be added to the phenolic resol resin prior to foaming, examples being air-containing or porous inorganic or organic substances in powder form and titanium dioxide.

It is furthermore possible to use known modified phenolic resol resin for the production of the phenolic resin foams according to the invention. Examples of modifying agents are: furfurol, furfuryl alcohol, unsaturated hydrocarbons, saturated and unsaturated esters and polyesters, ketones such as acetone, etc.

The "solid resin content" of the phenolic resol resin is determined in the following manner: 2 g of the resol are heated for 90 minutes at 150° C. in an iron dish; then the residue is weighed.

EXAMPLES

Two phenolic resol resins A and B were prepared in the manner described below, and then different amounts of blowing agent plus calcium sulfate.$\frac{1}{2}H_2O$ were intimately mixed.

Resin A:

143 parts by weight of phenol are condensed with 228 parts by weight of a 30% aqueous formaldehyde solution with the addition of 0.715 parts of sodium hydroxide, in an aqueous solution at 100° C. for 70 minutes. The reaction mixture is then distilled in vacuo to a solid resin content of 72 to 78%. A castor oil rendered water-soluble by ethoxylation and having an ethoxylation degree of 40 is added in a quantity equal to 3% of the weight of the phenolic resol resin as a surface-active compound for cell and pore regulation. The resin thus produced has a viscosity of 4000 to 7000 cP at 20° C. determined in Hoeppler et al. according to DIN 53015.

Resin B:

143 parts by weight of phenol are condensed with 243 parts by weight of a 30% aqueous formaldehyde solution with the addition of 4.3 parts by weight of sodium hydroxide, in an aqueous solution at 100° C. for 50 minutes. The reaction mixture obtained is distilled in vacuo to a solid resin content of 70 to 75%, and then 3% by weight of the cell regulator described under "Resin A" is added. The resin then has a viscosity of 3000 to 5000 cP at room temperature. (Determined in Hoeppler et al according to DIN 53015.)

TABLE 1

| Experiment No. | Foam Resin Mixture | | | | | Additive |
|---|---|---|---|---|---|---|
| | Resin | Parts by wt. | n-pentane parts by wt. | Hardener | Parts by wt. | $CaSO_4 . \frac{1}{2} H_2O$ Parts by weight |
| 1 | B | 100 | 7.6 | I | 11.3 | — |
| 2 | B | 100 | 4.5 | I | 11.3 | — |
| 3 | B | 100 | 3.2 | I | 11.3 | — |
| 4 | B | 100 | 7.6 | I | 18.0 | 20 |
| 5 | B | 100 | 7.6 | I | 18.0 | 30 |
| 6 | B | 100 | 4.1 | I | 18.0 | 30 |
| 7 | A | 100 | 7.6 | II | 13.0 | — |
| 8 | A | 100 | 6.4 | II | 13.0 | 10 |
| 9 | A | 100 | 6.4 | II | 13.0 | 20 |
| 10 | A | 100 | 6.4 | II | 13.0 | 30 |

TABLE 1-continued

| | Foam Resin Mixture | | | | | Additive |
|---|---|---|---|---|---|---|
| Experiment No. | Resin | Parts by wt. | n-pentane parts by wt. | Hardener | Parts by wt. | CaSO$_4$ . ½ H$_2$O Parts by weight |
| 11 | A | 100 | 6.4 | IV | 30.0 | — |
| 12 | A | 100 | 4.5 | III | 13.0 | 25 |
| 13 | A | 100 | 6.4 | IV | 30.0 | 15 |

The phenolic resol resins are mixed with the quantities stated in Table 1 of a hardener that is described below, plus n-pentane as blowing agent and calcium sulfate.½H$_2$O. The foaming is performed in Examples 1-6 by pouring the intimate mixtures of the components into box-shaped open-top molds measuring 50×50 cm at the bottom and having a height of 100 cm. The foaming is performed with simultaneously increasing solidification at 40° to 70° C. within 30 to 90 minutes. After about 120 minutes the hardened foam blocks could be stripped from the molds. After complete cooling they were sawed into slabs.

For the continuous production of phenolic resin foam slabs (Examples 7 to 13) the components were proportioned by means of the conventional proportioning and mixing apparatus and the mixture was continuously delivered between the bands, heated to about 50° C., of a double-band press. After a detention time of about 12 minutes between the moving bands the foaming mixtures fill up the expected volume. The endless sheet of material leaving the double-band press is sawed by a cutoff saw into indivicual slabs.

The following hardeners were used in the experiments:

Hardener I:
100 parts by weight of glycol
100 parts by weight of hydrochloric acid (37% solution).

Hardener II:
p-toluenesulfonic acid, dissolved in dilute aqueous sulfuric acid.

Hardener III:
p-toluenesulfonic acid, in finely powdered form.

Hardener IV:
Mixture of 10.0 parts by weight of very finely powdered p-toluenesulfonic acid, 20.0 parts by weight of very finely powdered boric acid, and 0.2 parts by weight of silicon dioxide.

The foam castings or slabs manufactured according to the individual examples had the characteristics described in Table 2.

As is indicated in Table 2, the shrinkage of the products of the invention can be less than about 0.4%, or less than about 0.35% or less than about 0.3%, shrinkage herein being defined as is indicated in Table 2.

The weight loss for 28 days, at 20° C. and 65% relative humidity can be less than about 14%, or less than about 13%, or less than about 12%.

TABLE 2

CHARACTERISTICS OF THE FOAM MATERIALS

| Experiment No. | Density (g/cm$^3$) | Compressive strength, DIN 53421 (kp/cm$^2$) | Shrinkage in length* after 8 days at 50° C. (%) | Weight Loss* after 8 days at 50° C. (%) | Weight Loss* after 28 days at 20° C. 65% rel. humidity (%) |
|---|---|---|---|---|---|
| 1 | 0.060 | 4.3 | 0.74 | 27.8 | 19.3 |
| 2 | 0.071 | 5.1 | 0.71 | 27.1 | 18.5 |
| 3 | 0.087 | 6.9 | 0.65 | 25.4 | 17.7 |
| 4 | 0.054 | 3.8 | 0.30 | 21.7 | 13.5 |
| 5 | 0.063 | 3.9 | 0.25 | 20.3 | 10.2 |
| 6 | 0.072 | 4.8 | 0.23 | 17.4 | 9.3 |
| 7 | 0.046 | 2.1 | 0.64 | 24.4 | 17.9 |
| 8 | 0.048 | 1.9 | 0.35 | 16.1 | 12.5 |
| 9 | 0.058 | 1.9 | 0.29 | 13.4 | 11.8 |
| 10 | 0.078 | 1.8 | 0.34 | 13.0 | 11.1 |
| 11 | 0.047 | 2.2 | 0.50 | 16.3 | 12.6 |
| 12 | 0.061 | 3.5 | 0.29 | 12.2 | 9.6 |
| 13 | 0.054 | 1.9 | 0.37 | 14.7 | 12.1 |

*Measured on specimens size 200 × 100 × 30 mm

What is claimed is:

1. Phenolic resin foam having improved dimensional stability having dispersed therein CaSO$_4$.nH$_2$O, wherein n is less than 2, in an amount of about 5-50% of the weight of the solid resin content of the phenolic resol resin.

2. Phenolic resin foam according to claim 1, n being 0 to ½.

3. Phenolic resin foam according to claim 2, said amount being about 10-30%.

4. Phenolic resin foam according to claim 1, the shrinkage thereof being less than about 4%, the weight loss for 28 days, at 20° C. and 65% relative humidity being less than 14%.

5. Phenolic resin foam according to claim 3, the shrinkage thereof being less than about 4%, the weight loss for 28 days, at 20° C. and 65% relative humidity being less than 14%.

6. In a process for production of phenolic resin foam according to claim 1, having reduced shrinkage and weight loss, which comprises foaming a mixture of liquid resol phenolic resin, a blowing agent, a hardener, and a surface active agent, wherein the improvement comprises including in said mixture pulverized CaSO$_4$.nH$_2$O wherein n is less than 2, in an amount of about 5-50% by weight of the solid resin content of the phenolic resol resin.

7. Process according to claim 6, said amount being about 10-30%, and n being 0 to ½.

8. Process according to claim 6, wherein at least one other inorganic calcium salt, in pulverized form, is included in said mixture, in such quantities that the content thereof amounts to about 0.1 to 5% by weight, with reference to water-free calcium sulfate, of the added calcium sulfate.

9. Process according to claim 6, wherein at least one air containing or porous inorganic or organic substance in pulverized form is included in the mixture in amount of up to 20% by weight of the mixture.

10. Process according to claim 6, characterized in that modified resols are used as the foamable phenolic resol resins.

11. A phenolic resin foam according to claim 1 containing 10–50% by weight of said $CaSO_4 \cdot nH_2O$.

12. A process according to claim 6 wherein said $CaSO_4 \cdot nH_2O$ is included in the mixture in an amount of 10–50 percent by weight.

13. A process according to claim 12 wherein said $CaSO_4 \cdot nH_2O$ is included in said mixture in an amount of 10–30 percent by weight.

14. A phenolic resin according to claim 1 wherein said $CaSO_4 \cdot nH_2O$ is present in an amount of at least 15 percent by weight.

15. A phenolic resin according to claim 14 wherein said $CaSO_4 \cdot nH_2O$ compound is present in an amount of from 15 to 30 percent by weight.

16. A process according to claim 6 wherein said $CaSO_4 \cdot nH_2O$ compound is present in an amount of at least 15 percent by weight.

17. A process according to claim 6 wherein said blowing agent is n-pentane.

18. A process according to claim 6 wherein said blowing agent is petroleum ether.

19. A process according to claim 6 wherein said hardener is a solid hardener.

20. A process according to claim 19 wherein said solid hardener comprises a mixture of powdered p-toluene sulfonic acid and powdered boric acid.

* * * * *